E. V. ULLRICH.
TRACTOR.
APPLICATION FILED JULY 29, 1918.
1,380,609.
Patented June 7, 1921.
3 SHEETS—SHEET 2.
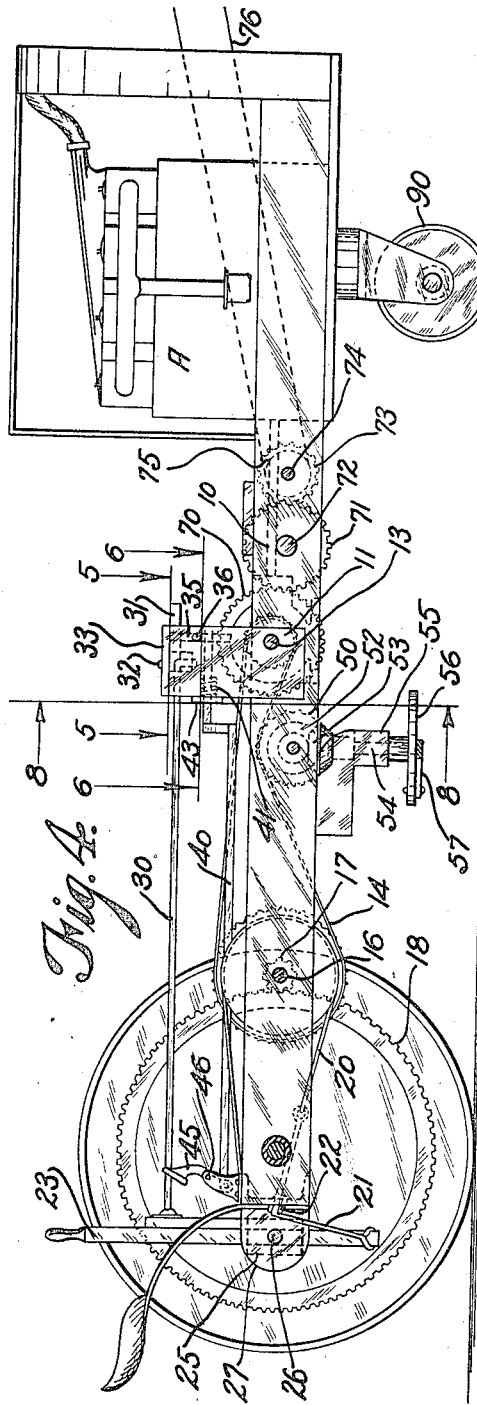
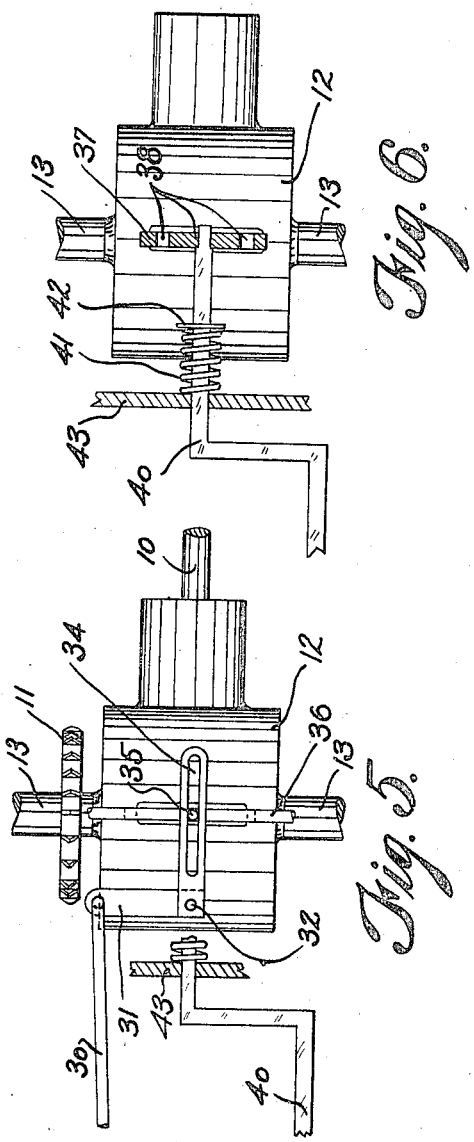
Inventor
E. V. Ullrich.

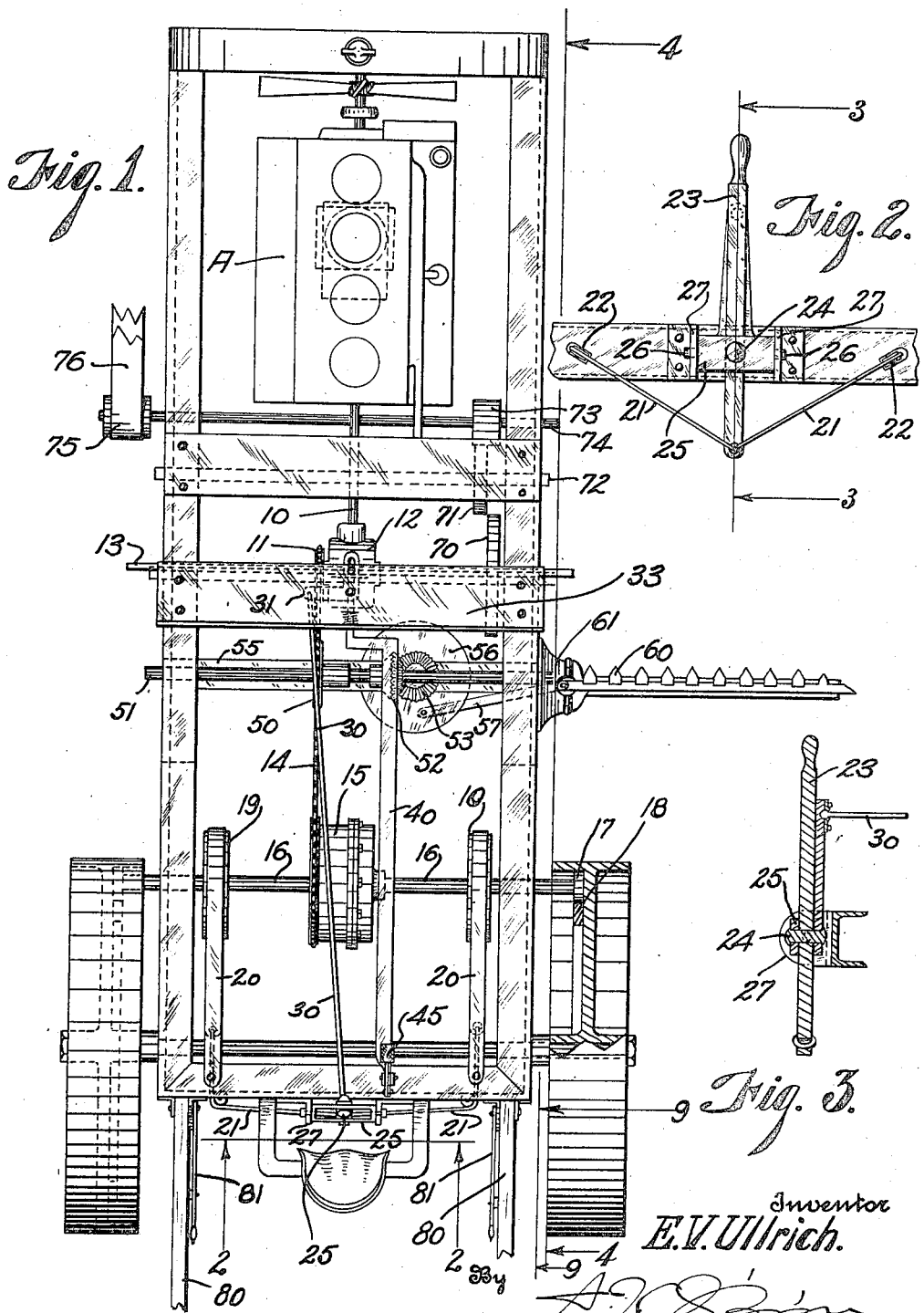

E. V. ULLRICH.
TRACTOR.
APPLICATION FILED JULY 29, 1918.
1,380,609.
Patented June 7, 1921.
3 SHEETS—SHEET 3.
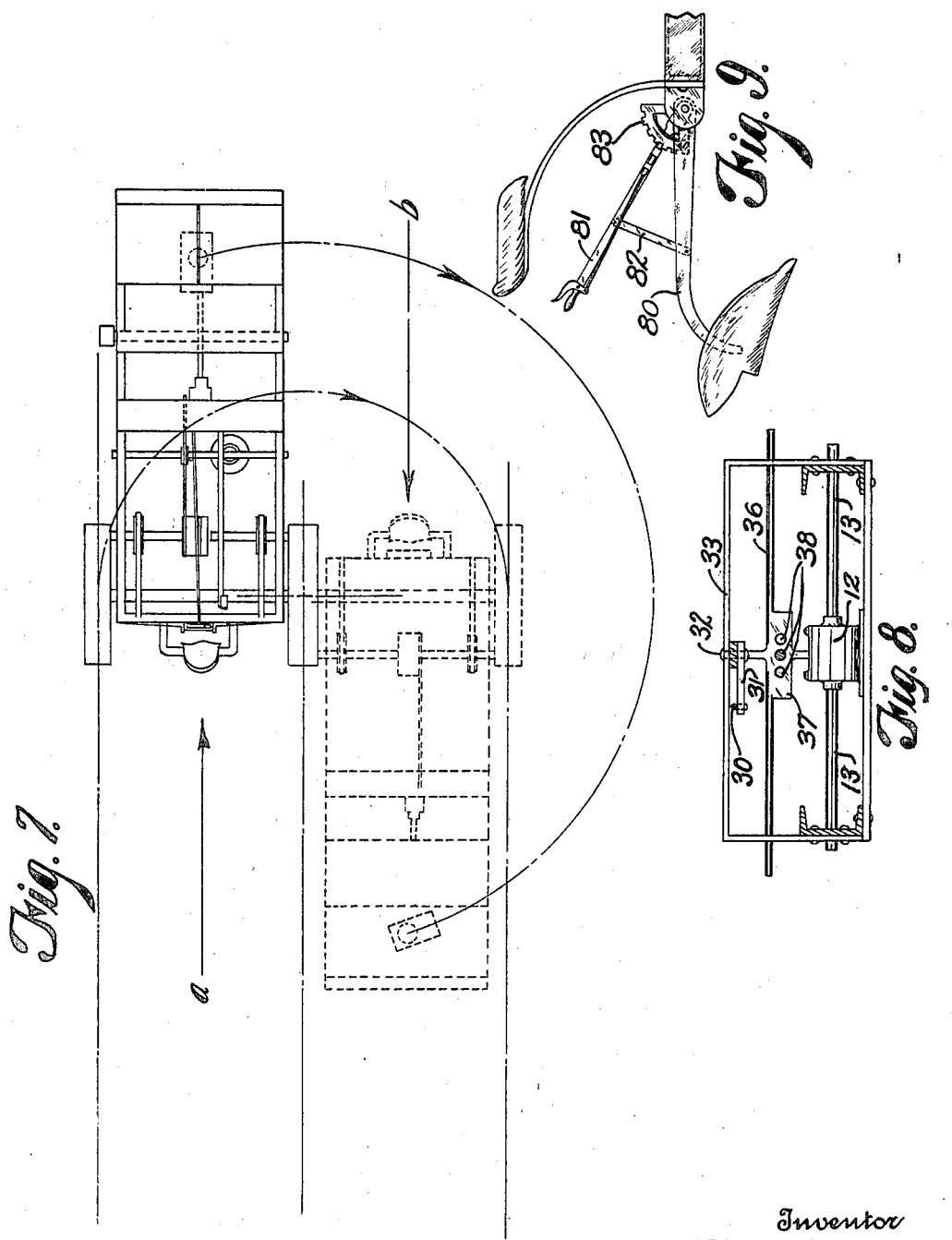

UNITED STATES PATENT OFFICE.

EDGAR V. ULLRICH, OF COLORADO SPRINGS, COLORADO.

TRACTOR.

1,380,609.  Specification of Letters Patent.  Patented June 7, 1921.

Application filed July 29, 1918. Serial No. 247,152.

*To all whom it may concern:*

Be it known that I, EDGAR V. ULLRICH, a citizen of the United States, residing at Colorado Springs, county of El Paso, and State of Colorado, have invented certain new and useful Improvements in Tractors; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means for transmitting power in tractors and the object thereof is to furnish power for various uses and also to enable the tractor to be turned short using one drive wheel as a pivot point without the necessity of making the turn on a large radius.

Briefly, the invention comprises a chassis on the front of which a caster wheel is mounted and on the rear of which two tractors wheels are mounted. The tractor wheels have internal gears meshing with pinions on shafts connected with a differential. The machine is steered through the medium of a pair of braking devices mounted on the jack shafts on opposite sides of the differential. When the braking means on one shaft is placed in operation this shaft will cease to impart power to its tractor wheel, whereupon this wheel will serve as a pivot point and the other tractor wheel will describe an arc of a circle thereabout, the caster wheel turning and also describing an arc. By variously tensioning the braking means on one wheel more or less power may be transmitted to the other wheel causing the tractor to turn as desired. Means are provided also to take off power as from a pulley to operate a threshing machine or the like. In addition a connection is provided for the transmission of power to the cutting bar of a mower which may be attached to the tractor. At the rear of the tractor means are provided for the mounting of gangs of two-way plows and for elevating the plows when desired.

In the drawings: Figure 1 is a plan of the tractor.

Fig. 2 is a fragmentary elevation indicated by line 2—2 of Fig. 1 showing the lever for operating the braking mechanism, which lever also operates the transmission clutch.

Fig. 3 is a vertical section on line 3—3 of Fig. 2.

Fig. 4 is a side elevation indicated by line 4—4, Fig. 1, omitting the plow attachments.

Fig. 5 shows a fragment as indicated by line 5—5, Fig. 4.

Fig. 6 shows a fragment as indicated by line 6—6, Fig. 4.

Fig. 7 indicates diagrammatically the way in which the tractor is turned from travel in the direction of arrow *a* into position to travel in the opposite direction as indicated by arrow *b*.

Fig. 8 is a view taken approximately on the line 8—8 of Fig. 4 showing the clutch shifting mechanism.

Fig. 9 is taken on line 9—9 of Fig. 3 and indicates the mounting and means for elevating the two-way plows.

An internal combustion engine shown conventially at A is mounted on the chassis and the usual crank shaft 10 extends therefrom to the gear shift conventionally shown at 12 mounted on shaft 13. A drive chain 14 extends rearwardly from gear 11 on shaft 13 to the differential shown conventionally at 15 from which the jack shafts 16 extend, these shafts having pinions 17 thereon engaging internal gears 18 of the tractor wheels. Each shaft 16 also has thereon a brake drum 19 over which a brake band 20 engages. The bands 20 are connected with extensions 21 which pass over pulleys 22 in the framework and are secured to the lower end of a control lever 23.

Control lever 23 is pivoted at 24 for lateral motion on a block 25. When in central position the lever releases both brakes, but when swung to one side it applies one of the brakes and when swung to the other side it applies the other brake. The block 25 in turn has its ends pivoted at 26 in ears 27 on the frame thus permitting backward and forward movement of the lever 23. This is for the purpose of controlling the gear shift 12. To accomplish such control a rod 30 is connected to the upper part of lever 23 and extends forward having its forward end connected with a bell crank 31 pivoted at 32 to a cross plate 33. The forward portion of this arm has a slot 34 in which the stem 35 of the gear shift engages, the latter being guided by means of rods 36 connected with the blade 37 thereof and extending through the framework.

To lock the gear shift in reverse, forward or neutral, the blade 37 is provided with three holes 38 to be engaged by the reduced end of a rod 40. A spring 41 mounted on the rod between an abutment 42 on the rod and a cross bar 43 on the framework tends to force said reduced end into engagement with one of the holes 38. For operation of the rod it is pivoted to a pedal 45 pivotally mounted at 46 on a support on the chassis, the pedal being close to the driver's seat. The rod 40 may be retracted at will for shifting the gear shift to any desired position, the rod upon release of the pedal being moved into engagement with the registering hole 38 by spring 41.

For operation of a mower a gear wheel 50 engaged by drive chain 14 is provided on shaft 51 mounted in the chassis. Shaft 51 is also provided with a bevel gear 52 engaging a bevel gear 53 on vertical stub shaft 54 mounted in a cross bar 55. On the lower end of the stub shaft a disk 56 is provided with which a pitman rod 57 is connected, this pitman rod being designed to reciprocate a cutter bar 60 of a mower adapted for connection to an arm 61 on the chassis.

For taking off power to run a thresher or the like a gear 70 is mounted on the clutch shaft 13. A gear 71 on a shaft 72 is adapted to be moved into engagement with gear 70 when the clutch is in neutral, the gear 71 engaging a gear 73 on shaft 74. On one end of shaft 74 a pulley 75 or the like is provided which may be coupled with a belt 76 running to the thresher or similar machine.

Gangs of two-way plows may be carried on the rear of the chassis, the beams 80 thereof (of which only two are shown) being pivoted on the chassis and adapted to be elevated as desired through the medium of levers 81 connected with the beams 80 by links 82 and coöperating with racks 83. The value of two-way plows is well known and by the means here disclosed they may be advantageously carried and manipulated.

The method of handling the plows and of transmitting power to the mower and pulley 75 will be clear from the preceding description.

The tractor is controlled through the lever 23 which the driver operates continuously as he would the steering wheel of the usual type of tractor or automobile. Pressure on the pedal withdraws the rod 40 from the blade 37 permitting shifting of the clutch. By moving the lever 23 forward or backward the gear shift is operated through the medium of the rod 30 and bell crank 31. When the gear shift has been shifted the pedal 45 is released and the spring 41 returns the rod 40 which engages another of the holes 38 and locks the gear shift against further shifting.

To steer the tractor the lever 19 is shifted laterally tensioning one of the brake bands 20 upon its drum 19. This either retards or completely stops rotation of the corresponding jack shaft 16, depending upon the amount of tension of the band.

The differential, however, will permit rotation of the other jack shaft with the result that the corresponding wheel will commence to move in a circle about the retarded or stationary wheel. The caster wheel 90 will immediately respond to any change in direction. Release of the brake band will result in equal rotation of the tractor wheels again and the vehicle will move forward. By thus manipulating the lever 23 the tractor may be caused to move in whatever direction the driver desires. This will require more or less constant manipulation, as does the ordinary steering wheel, especially when working in the field where unevenness tends to affect the movement.

When it is desired to make a short turn, the brake will be applied sufficiently tight to one wheel to cause it to stop entirely. As indicated in Fig. 7 the free wheel will then describe the arc of a circle about the vertical center of the stationary wheel until the brake is released from the stationary wheel. If an arc of 180° has been described as in Fig. 7 the tractor will then be in position to move in the opposite direction as indicated by arrow $b$, from that of its former movement as indicated by arrow $a$.

I claim:

1. The combination with a tractor having a gear shift, a differential and jack shafts extending from said differential, of braking mechanism for each jack shaft, a lever pivoted to move in planes at angles to each other, a connection between said lever and braking mechanism to operate the latter when the lever is moved in one plane, and a connection between the lever and said gear shift to operate said gear shift when the lever is moved in the other plane.

2. The combination with a tractor having a gear shift, a differential and jack shafts extending from said differential, of braking mechanism for each jack shaft, a lever pivoted to move in planes at angles to each other, a connection between said lever and braking mechanism to operate the latter when the lever is moved in one plane, and a connection between the lever and said gear shift to operate said gear shift when the lever is moved in the other plane, said lever applying the braking mechanism of one jack shaft without applying that of the other shaft.

In testimony whereof I affix my signature.

EDGAR V. ULLRICH.